United States Patent
Briant et al.

(10) Patent No.: US 7,047,675 B2
(45) Date of Patent: May 23, 2006

(54) DETACHABLE CLEAT SYSTEM

(75) Inventors: Antoine Briant, Montebelluna (IT); Erwin Friedrich Saur, Schwabach (DE)

(73) Assignee: adidas International Marketing B.V., Amsterdam (NL)

( * ) Notice: Subject to any disclaimer, the term of this patent is extended or adjusted under 35 U.S.C. 154(b) by 14 days.

(21) Appl. No.: 10/688,793

(22) Filed: Oct. 17, 2003

(65) Prior Publication Data

US 2004/0159020 A1 Aug. 19, 2004

Related U.S. Application Data

(63) Continuation-in-part of application No. 10/125,057, filed on Apr. 18, 2002, now Pat. No. 6,748,677.

(30) Foreign Application Priority Data

Apr. 18, 2001 (DE) ................. 101 18 986
Oct. 17, 2002 (DE) ................. 102 48 482

(51) Int. Cl.
*A43B 5/00* (2006.01)
(52) U.S. Cl. ...................... 36/134; 36/67 D
(58) Field of Classification Search ............... 36/134, 36/67 R, 670
See application file for complete search history.

(56) References Cited

U.S. PATENT DOCUMENTS

| | | | | |
|---|---|---|---|---|
| 1,141,889 A | * | 6/1915 | Trolle | 36/36 R |
| 1,970,254 A | * | 8/1934 | Sullivan | 36/36 R |
| 2,192,150 A | * | 2/1940 | Pierce et al. | 36/134 |
| 2,607,134 A | | 8/1952 | Langer | |
| 3,054,197 A | | 9/1962 | Morgan et al. | |
| 3,526,976 A | * | 9/1970 | Jacobs | 36/100 |
| 4,035,934 A | | 7/1977 | Hrivnak | |
| 4,492,047 A | * | 1/1985 | Arff | 36/134 |
| 4,633,600 A | | 1/1987 | Dassler et al. | |
| 4,644,672 A | | 2/1987 | Dassler et al. | |
| 5,243,775 A | * | 9/1993 | Swain | 36/134 |
| 5,361,518 A | * | 11/1994 | Sussmann et al. | 36/134 |
| 5,386,651 A | * | 2/1995 | Okamoto | 36/134 |
| 5,638,615 A | | 6/1997 | Korsen | |
| 5,848,482 A | * | 12/1998 | Bathum | 36/127 |
| 6,050,006 A | * | 4/2000 | Swindle | 36/134 |
| 6,108,944 A | | 8/2000 | Savoie | |
| 6,112,433 A | * | 9/2000 | Greiner | 36/67 R |
| 6,513,266 B1 | | 2/2003 | Ijiri | |
| 6,722,061 B1 | * | 4/2004 | Auger et al. | 36/136 |
| 6,748,677 B1 | * | 6/2004 | Briant et al. | 36/134 |

FOREIGN PATENT DOCUMENTS

WO 92/18027 * 10/1992

* cited by examiner

*Primary Examiner*—Marie Patterson
(74) *Attorney, Agent, or Firm*—Goodwin Procter LLP (57) ABSTRACT

The present invention relates to a sole made from a first material, at least one receptacle made from a second material, and at least one stud, which can be releasably mounted within the receptacle by inserting a fastening projection of the stud into the receptacle. The fastening projection includes a first locking member, and the receptacle includes a flexible wall having a second locking member. The flexible wall is deflected when the fastening projection is inserted into the receptacle until the first and the second locking members engage.

10 Claims, 10 Drawing Sheets

DETACHABLE CLEAT SYSTEM

CROSS-REFERENCE TO RELATED APPLICATION

This application is a continuation-in-part of U.S. patent application Ser. No. 10/125,057 which was filed on Apr. 18, 2002 now U.S. Pat. No. 6,748,677 and which is hereby incorporated herein by reference in its entirety. This application incorporates by reference, and claims priority to and the benefit of, German patent application serial number 10248482.1, filed on Oct. 17, 2002, and German patent application serial number 10118986.9, filed on Apr. 18, 2001.

TECHNICAL FIELD

The present invention relates to an article of footwear, the outsole of which is provided with exchangeable studs. In particular, the present invention relates to a sole with at least one receptacle and at least one stud that can be releasably mounted in the receptacle.

BACKGROUND

It is known to provide sports shoes or walking boots, and in particular soccer shoes, with studs in order to increase the grip of the shoe, in particular, on soft ground such as grass. The term "studs" is to be understood in the context of the present invention as meaning all possible elements which are arranged on outsoles of footwear in order to increase grip. The term "studs" is intended to include, for example, studs for soccer shoes, spikes for golf shoes, and studs for walking boots.

If the shoes are to be used on different ground conditions, it is advantageous if the studs are releasably attached to the sole to allow the shoes to be adapted to the different ground conditions. It has been known to attach studs to the soles of soccer shoes by means of threads. In addition to being able to adapt the shoe to a particular ground condition, worn studs can be replaced so that a new shoe is not necessary. If, however, during a soccer game (or a golf tournament) the studs must be replaced in a very short time due to changing weather conditions and/or changing ground conditions, screw studs anchored by screw threads or by additional pins or expanding elements, etc., are disadvantageous due to the time required to change the studs.

Other attachment systems exist where, for example, the stud can be "clipped" into a corresponding receptacle of the sole simply by inserting the stud without having to perform any additional assembly step. Such constructions are, for example, disclosed in U.S. Pat. No. 5,638,615 and U.S. Pat. No. 4,035,934, the disclosures of which are hereby incorporated herein by reference in their entireties.

U.S. Pat. No. 5,638,615 discloses a metal socket with a circular snap ring provided therein. The snap ring is made from flexible steel and, together with the socket, is embedded in a receptacle for the stud during the manufacture of the sole. When a base portion of the stud to be mounted is inserted, the snap ring is expanded before it snaps into an annular groove of the base portion and thereby fastens the stud. The rotationally symmetric form of the receptacle and the stud allows for rotation of the mounted stud in the receptacle.

Similarly, U.S. Pat. No. 4,035,934 discloses two metal spring pins arranged in a receptacle, which are deflected during insertion of a base member of the stud and engage a corresponding groove of the base member when the base member is completely inserted. The complete receptacle with the spring pin and other components is preassembled on a plate during the manufacture of the sole and is subsequently attached in a corresponding bore of the sole.

Disadvantages of the studs of U.S. Pat. Nos. 5,638,615 and 4,035,934 include the manufacturing complexity and the resulting costs. As previously mentioned, an initial preassembly of the receptacle assembly is required and the receptacle assembly is subsequently connected to the sole in a further manufacturing step. Also, the large number of small parts used renders automation difficult, such that a substantial amount of manual work is required. Further, there are metal parts used in the receptacle assembly that are susceptible to rust, and there is always the danger of losing a spring or a snap ring when the studs are replaced.

U.S. Pat. No. 5,848,482, the disclosure of which is hereby incorporated herein by reference in its entirety, discloses a stud, where the receiving unit and/or the mounting pin of the stud are made from a deformable elastomeric material. During insertion of the receiving unit and/or the mounting pin, the material is compressed and expands only in the mounting position of the stud, which is thereby fastened to the sole. This assembly allows for the stud to be detached from the sole. However, the force required to mount and release the stud is considerable due to the necessary compression of the material of the stud and/or receiving unit. Consequently, it is difficult to replace multiple studs on a shoe in a short duration of time.

It is, therefore, an object of the invention to provide a sole for the releasable attachment of at least one stud, which combines the advantages of an easy mounting of the stud with a simple and cost efficient manufacture of the sole and which does not require the use of a large number of small parts.

SUMMARY OF THE INVENTION

The present invention relates to a sole with at least one receptacle and at least one stud, which can be releasably mounted in the receptacle by insertion. A fastening projection extending from the stud and including a locking member is insertable into the receptacle, thereby deflecting a flexible wall within the receptacle. The flexible wall also includes a locking member that engages the stud locking member to prevent inadvertent release of the stud.

The flexible wall of the receptacle acts like a "spring element," allowing interlocking of the locking members when the fastening projection of the stud is inserted. Because the flexible wall is an integral part of the sole, no additional components are required, in contrast to the prior art. On the contrary, a sole in accordance with the invention may be manufactured as a single piece, including the receptacle with the flexible wall and the locking member. Typically, a cavity is provided in the sole adjacent to the receptacle, so that the flexible wall is deflected into the cavity during insertion of the fastening projection. This facilitates elastic deflection of the wall, without having to provide special, highly elastic materials in the receptacle.

The fastening projection of the stud can be oblong and the wall between the cavity and the receptacle can be generally parallel to a longitudinal axis of the fastening projection. Thus, the stud is secured against rotation in the receptacle. This is desirable, especially if the studs have a distinct asymmetric shape in order to meet specific functional requirements. Further, if desired, a key and slot or other mating structure can be provided on the projection and in the receptacle so that the stud can be inserted in solely a single orientation.

In one aspect, the invention relates to a sole including a bottom surface defining a receptacle and a stud removably inserted therein. The receptacle includes a flexible wall and a first locking member disposed on an internal surface of the flexible wall. The stud includes a ground-engaging portion and a fastening projection extending therefrom. The fastening projection includes a second locking member disposed on an external surface thereof and is for insertion into the receptacle. The fastening projection deflects the flexible wall when inserted into the receptacle until the first locking member and the second locking member engage.

In another aspect, the invention relates to an article of footwear including an upper and a sole. The sole includes a bottom surface defining a receptacle and a stud removably inserted therein. The receptacle includes a flexible wall and a first locking member disposed on an internal surface of the flexible wall. The stud includes a ground-engaging portion and a fastening projection extending therefrom. The fastening projection includes a second locking member disposed on an external surface thereof and is for insertion into the receptacle. The fastening projection deflects the flexible wall when inserted into the receptacle until the first locking member and the second locking member engage.

In yet another aspect, the invention relates to a stud for a shoe sole. The stud includes a ground-engaging portion and a fastening projection extending from the ground-engaging portion. The fastening projection includes a locking member disposed on an external surface thereof and is insertable into a receptacle disposed in the shoe sole. The fastening projection deflects a flexible wall of the receptacle when inserted into the receptacle until the locking member engages a mating locking member disposed within the receptacle.

In various embodiments of the foregoing aspects of the invention, the sole forms a cavity disposed adjacent the flexible wall of the receptacle. The cavity can receive the flexible wall when deflected by the fastening projection. The first locking member can be a protuberance and the second locking member can be a mating recess for engaging the protuberance when the fastening projection is inserted into the receptacle. In another embodiment, the first locking member can be a recess and the second locking member can be a mating protuberance for engaging the recess when the fastening projection is inserted into the receptacle. During insertion of the fastening projection, the flexible wall is pressed into the cavity until the protuberance and the corresponding recess are aligned and engage each other. In one embodiment, the cavity can be formed as a recess, open to a top surface of the sole.

In other embodiments, the receptacle can include a second flexible wall and an additional first locking member disposed on an internal surface of the second flexible wall. The fastening projection can include a corresponding additional second locking member disposed on the external surface of the fastening projection. The sole can further form a second cavity disposed adjacent the second flexible wall of the receptacle. The second cavity can receive the second flexible wall when deflected by the fastening projection.

Furthermore, the receptacle, the cavity, and the flexible wall can be integrally formed with the sole. In one embodiment, the fastening projection of the stud has a generally oblong shape. The flexible wall(s) of the receptacle can be substantially parallel to a longitudinal axis of the fastening projection. In one embodiment, at least one side of the receptacle is at least partially circumscribed by the cavity and the flexible wall. The first flexible wall and the second flexible wall can be generally disposed on opposite sides of the receptacle. The two second locking members can be disposed on a first longitudinal side and a second longitudinal side of the fastening projection, respectively, and the two first locking members can be disposed on the corresponding flexible walls of the receptacle.

In addition, the ground-engaging portion of the stud can optionally include an engagement feature for facilitating removing the stud from the receptacle. The engagement feature can include at least one recess disposed on an external surface of the ground-engaging portion. Alternatively, the engagement feature can include two recesses generally disposed on opposite sides of an external surface of the ground-engaging portion. In one embodiment, the receptacle is disposed at least partially within a downwardly projecting base member disposed on the bottom surface of the sole. The base member can optionally include an insert disposed within a distal end of the receptacle. The insert can optionally include a metal ring. The sole can include a plurality of receptacles and a plurality of corresponding studs.

In another aspect of the invention, a method for manufacturing a sole is provided. Included in the method is the step of providing at least one receptacle forming a cavity for receiving a stud including a fastening projection having at least a first locking means. The method also includes the step of forming a sole body around the at least one receptacle.

In one embodiment of the method, the receptacle includes at least one integral wall, where the wall includes at least a second locking means. The step of providing the at least one receptacle can also include injection molding the at least one receptacle. In another embodiment, the sole body is formed around the at least one receptacle in an injection molding process. The at least one receptacle, in yet another embodiment, is formed within an insert. A plurality of receptacles can also be provided. The method can further include the step of providing a stud for insertion into the at least one receptacle. In another embodiment, the at least one receptacle is formed from a first material having a first stiffness and the sole body is formed from a second material having a second stiffness.

In another aspect, the invention relates to a sole. The sole includes a bottom surface defining a stud base. Also included is a receptacle, the receptacle disposed at least partially within the stud base. The receptacle includes a flexible wall and a first locking member disposed on an internal surface of the flexible wall. The sole also includes a stud where the stud includes a ground-engaging portion and a fastening projection extending from the ground-engaging portion for insertion into the receptacle.

In one embodiment, the fastening projection of the stud further includes a second locking member disposed on an external surface and the fastening projection deflects the flexible wall when inserted into the receptacle such that the first locking member and the second locking member engage. The sole can further include a cavity formed adjacent the flexible wall of the receptacle for receiving the flexible wall when deflected by the fastening projection. In another embodiment, the first locking member includes a protuberance and the second locking member includes a mating recess for engaging the protuberance when the fastening projection is inserted into the receptacle. The receptacle can also include a second flexible wall and an additional first locking member disposed on an internal surface of the second flexible wall. In this embodiment, the fastening projection also includes a corresponding additional second locking member disposed on the external surface of the fastening projection. In yet another embodiment, the sole can further include a second cavity formed adjacent the second flexible wall of the receptacle for receiving the second flexible wall when deflected by the fastening projection. The fastening projection of the stud, in another embodiment, has a generally oblong shape. In yet another embodiment, the two second locking members are disposed on a first longitudinal side and a second longitudinal side of the fastening projection and the two first locking members are disposed on corresponding flexible walls. The ground engaging portion of the stud can include an engagement feature for facilitating removing the stud from the receptacle. In another embodiment, the sole is formed from a first material having a first stiffness and the receptacle is formed from a second material having a second stiffness. The sole, in another embodiment, is injection molded around the receptacle.

These and other objects, along with advantages and features of the present invention herein disclosed, will become apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

The drawings are not necessarily to scale, emphasis instead generally being placed upon illustrating the principles of the invention. In the following description, various embodiments of the present invention are described with reference to the following drawings, in which.

DETAILED DESCRIPTION OF THE INVENTION

Embodiments of the present invention are described below. It is, however, expressly noted that the present invention is not limited to these embodiments, but rather the intention is that modifications that are apparent to the person skilled in the art are also included. In particular, the present invention is not intended to be limited to soccer shoes, but rather to be used for all types of footwear in which standard profiled soles are insufficient to ensure that the wearer does not slip, so projections that penetrate into the ground (studs, spikes, etc.) are used, and the projections are releasably connected to the shoe sole. Further, only a left or right sole is depicted in any given figure; however, it is to be understood that the left and right soles are typically mirror images of each other and the description applies to both left and right soles. In certain activities that require different left and right sole configurations or performance characteristics, the soles need not be mirror images of each other.

Figure 1:
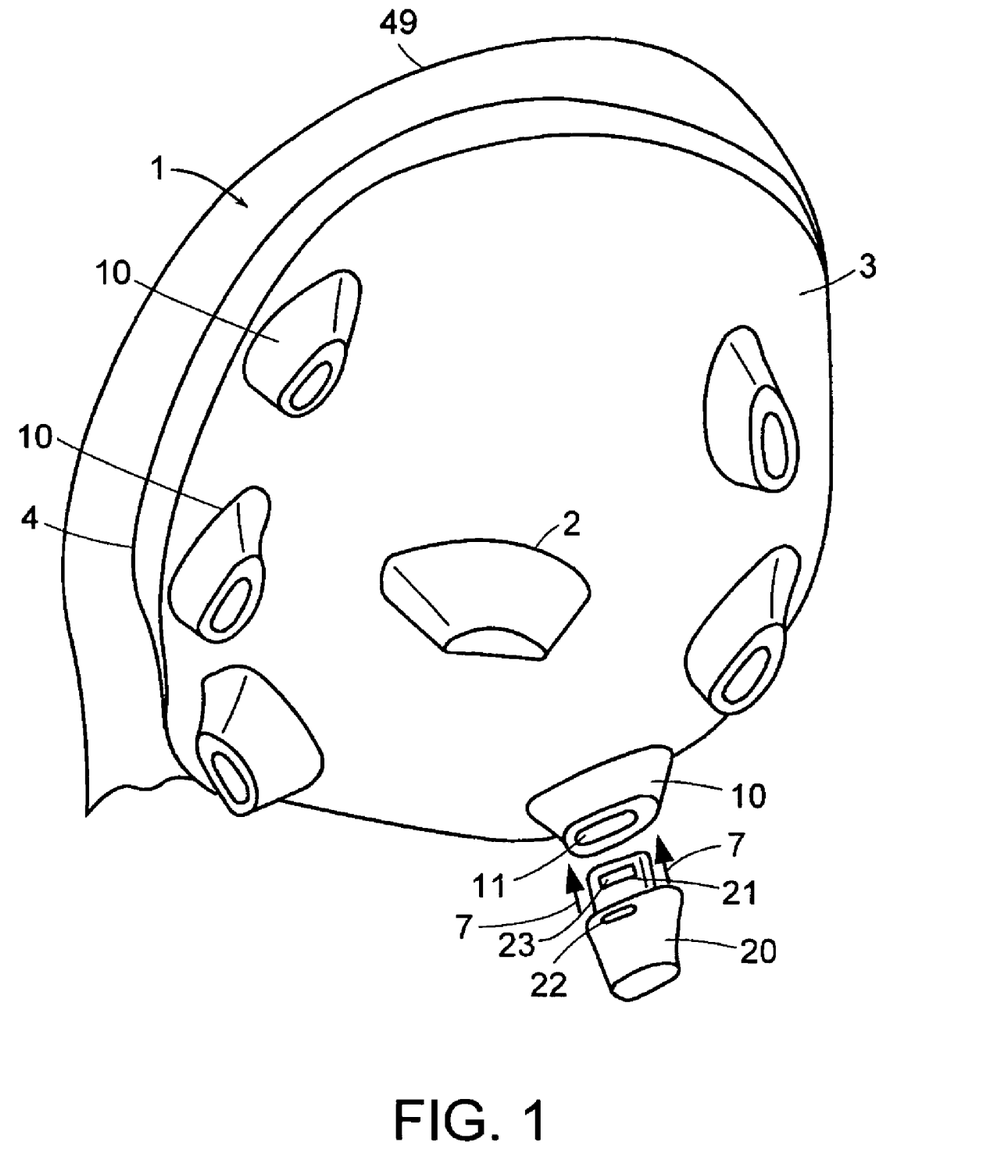
FIG. 1 is a schematic perspective view of a front portion of a sole in accordance with the invention.

FIG. 1 depicts a front portion of one embodiment of a sole 1 attached to an upper 49 in accordance with the invention. The sole 1 includes a plurality of integrally formed base members 10 projecting downwardly from a bottom surface 3 of the sole 1 and to which a corresponding number of studs 20 are releasably attached. The arrangement of the base members 10 along the edge of the sole 1 is only one possible configuration, as used in soccer shoes, for example; however, any number or configuration of base members 10 and studs 20 is also contemplated and within the scope of the invention. Alternatively or additionally, base members 10 can also be arranged in a heel portion (not shown) of the sole 1. In addition to the base members 10 for receiving the releasable studs 20, one or more studs 2 can be provided integrally or rigidly anchored to the sole 1.

Figure 11:
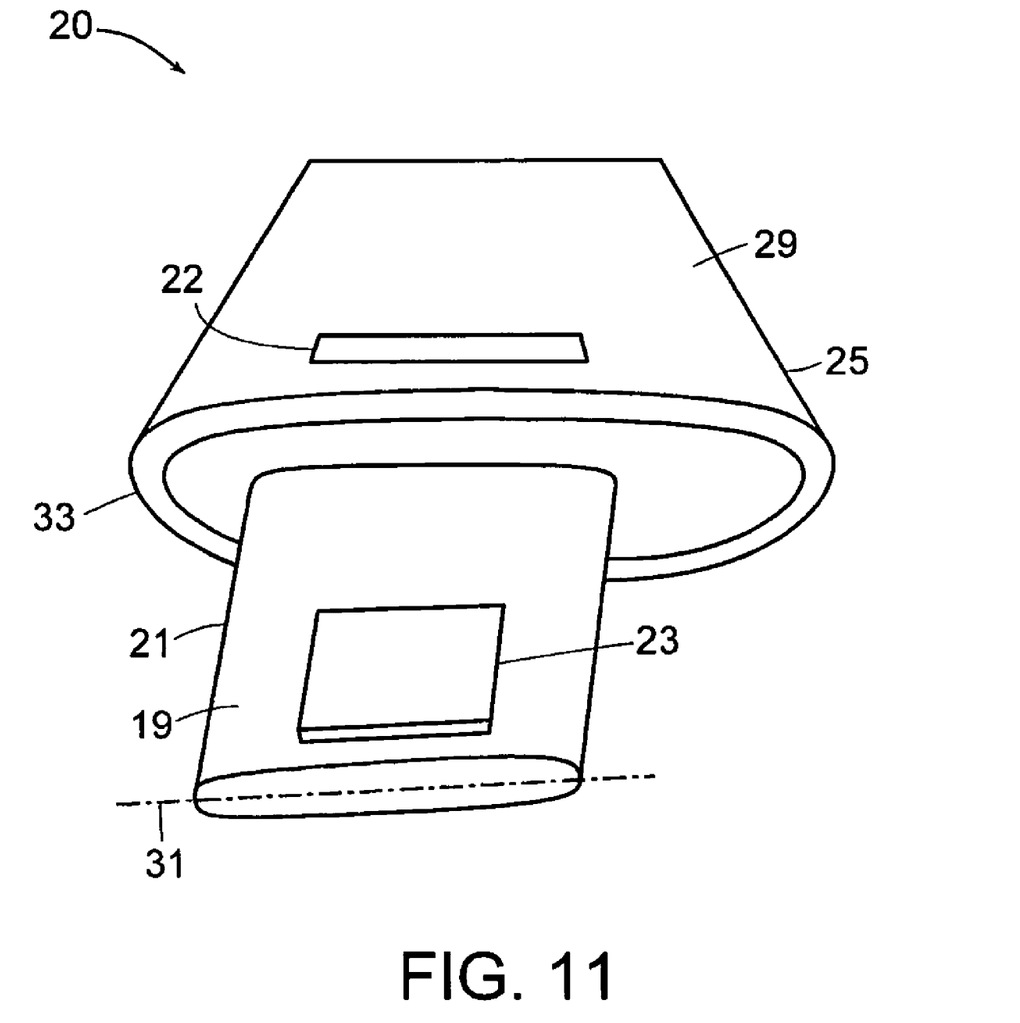
FIG. 11 is a schematic perspective view of one embodiment of a stud in accordance with the invention.

The stud 20, according to one embodiment, is depicted in FIG. 11. The stud 20 includes a ground-engaging portion 25 and a fastening projection 21 extending therefrom. The ground-engaging portion 25 has a generally oblong, frusto-conical shape and the fastening projection 21 has a generally oblong shape; however, the shape and size of the ground-engaging portion 25 and the fastening projection 21 can be chosen to suit a particular application. For example, the shape of the fastening projection 21 could be polygonal, arcuate, or combinations thereof. In the present application, the term polygonal is used to denote any shape including at least two line segments, such as rectangles, trapezoids, triangles, etc. Arcuate shapes include, for example, circular and elliptical.

Further, the fastening projection 21 includes a second locking member 23 disposed on an external longitudinal surface 19 of the fastening projection 21. There can be an additional second locking member 23 disposed on an opposite side of the fastening projection 21. Alternatively, the second locking member 23 can be disposed on an end of the fastening projection 21. The second locking member 23 is depicted as a generally rectangular recess; however, the second locking member 23 could be essentially any size or shape to suit a particular application. In an alternative embodiment, the second locking member 23 could be a protuberance.

The ground-engaging portion 25 includes an optional engagement feature 22 for facilitating disengaging the stud 20 from the sole 1. The engagement feature 22 shown is a recess disposed on an external surface 29 of the ground-engaging portion 25 of the stud 20. Alternatively, the engagement feature 22 could include a second recess disposed on the opposite side of the stud 20 or could be disposed along an edge 33 of the ground-engaging portion 25.

Referring back to FIG. 1, two arrows 7 schematically indicate that the stud 20 is releasably mounted to the sole 1 by insertion of its fastening projection 21 into a receptacle 11 at least partially formed and disposed within the corresponding base member 10. No other action, such as screwing or otherwise rotating the stud 20 is necessary for the attachment of the stud 20 after insertion of the fastening projection 21.

To remove the stud 20 from the base member 10, the reverse movement takes place, i.e., the stud 20 is pulled essentially vertically out of the receptacle 11. To assist in removing the studs 20, the engagement feature 22 can be provided on the sides of the stud 20. The engagement feature 22 can be engaged by a suitable claw-like tool to securely grasp and remove the stud 20. Alternatively, the engagement feature 22 could be a slit-like recess disposed on the edge 33 of the stud 20 adjacent the base member 10, such that a tool with a planar tip, such as screwdriver, could be used to assist in removing the stud 20 by prying. In addition, other types of engagement features 22 can be provided for engagement with the tool, for example, circular recesses or any suitable lateral protrusion(s). The foregoing method of engaging and disengaging the stud 20 allows a user to quickly replace all of the studs 20 on the sole 1 or any damaged studs, as necessary. Thus, the gripping properties of the shoe can be quickly adapted in response to changing ground conditions or stud wear, even during a game.

In the embodiment shown in FIG. 1, the fastening projection 21 of the stud 20, as well as the corresponding receptacle 11, have a generally oblong shape and the cavities 15 generally extend parallel thereto. Thus, the stud 20, of which the fastening projection 21 also has an oblong shape, is secured against rotation. It is, however, also possible to provide alternative or additional cavities 15 and corresponding walls 16, which surround semicircularly the ends of the oblong receptacle 11 (see FIG. 8).

Further, the receptacle 11 can have a distinct asymmetric shape corresponding to a similar shape of the fastening projection 21, so that the stud 20 can only be inserted in a specific orientation. If the studs 20 are different for different parts of the sole, it is further possible to provide individually designed receptacles 11 and fastening projections 21, so that each stud 20 fits only into its corresponding receptacle 11 or a limited number of receptacles 11. Alternatively, the receptacles 11 could include one or more cavities 15 with corresponding walls 16 having projections or recesses that are arranged around a rotationally symmetric receptacle 11, so that rotation of the fastening projection 21 is possible inside the receptacle 11. In this case, the receptacle 11 could include, for example, three cavities 15 with corresponding walls 16. In addition, the external surfaces of the ground-engaging portion 25 and the base member 10 can have corresponding shapes, such that the external surfaces are flush when the stud 20 is attached, so that the external surfaces smoothly conform to each other.

Figure 2:
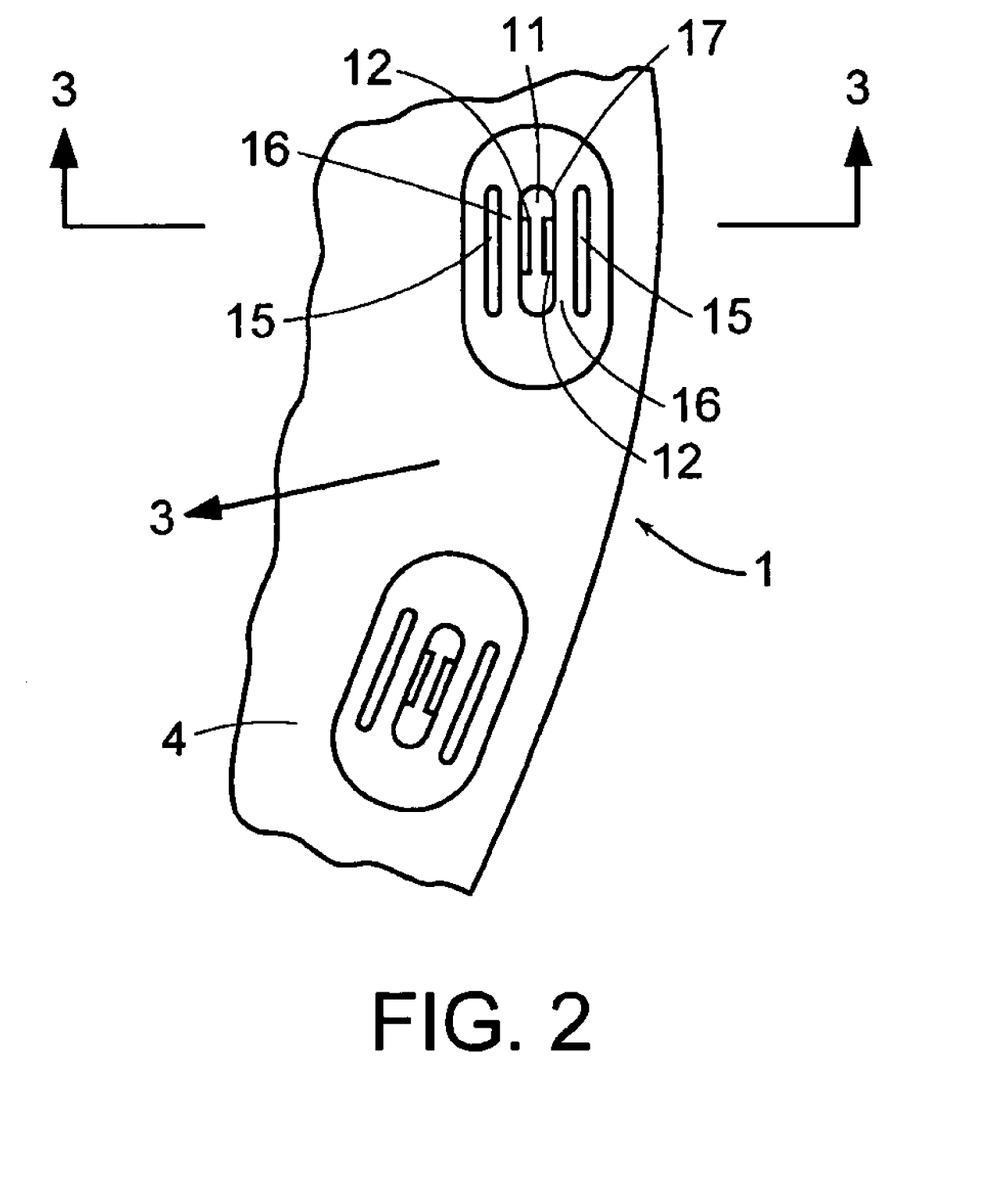
FIG. 2 is a schematic top plan view of a portion of the sole of FIG. 1.

FIG. 2 shows a detailed view of a top surface 4 of a portion of the sole 1 of FIG. 1. The sole 1 is manufactured from a first material and the receptacles 11 arranged in the bottom of the sole 1 are manufactured from a second material. The base member 10 can be either part of the receptacle 11 or the sole 1. Mixed constructions are also contemplated in accordance with the invention.

Figure 3:
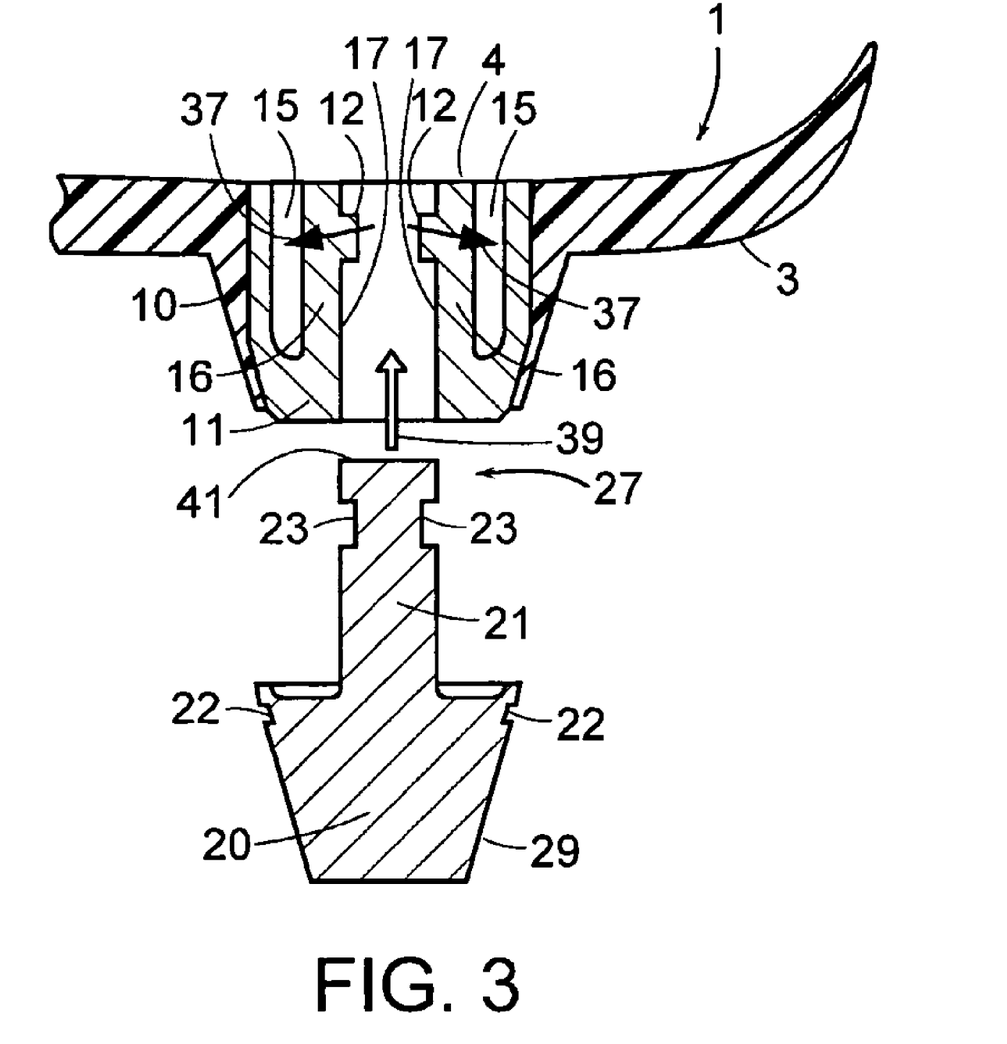
FIG. 3 is a schematic cross-sectional view of a detachable cleat system in accordance with the invention taken along line 3—3 in FIG. 2.

FIG. 3 is an enlarged cross-sectional view of the sole 1, the receptacle 11, and the stud 20. As can be seen, two inwardly directed protuberances 12 are arranged inside the receptacle 11, which engage the corresponding recesses 23 of the fastening projection 21 of the stud 20 when it is completely inserted into the receptacle 11. The inwardly directed protuberances 12 form the first locking members and are disposed on internal surfaces 17 of the flexible walls 16 of the receptacle 11. Alternatively, the first locking members 12 could be recesses that engage laterally extending protuberances (second locking members 23) on the fastening projection 21 of the stud 20. Also shown are two cavities 15 disposed adjacent the flexible walls 16 to permit flexure of the walls 16 when the stud fastening projection 21 is inserted into the receptacle 11.

With further reference to FIGS. 2–3, the two cavities 15 are arranged inside the receptacle 11. The cavities 15 are generally oblong recesses in the receptacle 11 and are open to the top side. This arrangement facilitates manufacture and removal from a mold, if the receptacle 11 is made from a single piece of plastic material by injection molding.

When, as indicated in FIG. 3 by vertical arrow 39, the fastening projection 21 is inserted into the receptacle 11, an upper end 27 pushes the flexible walls 16 and first locking members 12 apart (arrows 37). This is possible, because the flexible wall(s) 16 of the receptacle 11 has a certain elasticity, and can therefore be deflected elastically like a leaf spring into the cavity 15. The material used for the receptacle 11 determines, together with the thickness and the length of the flexible wall(s) 16, the resistance to the fastening projection 21 being inserted into the receptacle 11. Generally, the flexible wall(s) 16 is substantially perpendicularly disposed in the receptacle 11 and is generally parallel to a longitudinal axis 31 of the fastening projection 21 (FIG. 11). Alternatively, the flexible wall(s) 16 could be biased, for example inwardly, to increase or decrease the resistance and travel of the flexible wall(s) 16. Generally, once the second locking member(s) 23 and the first locking member(s) 12 engage, thereby locking the stud 20 in place, the flexible wall(s) 16 at least partially returns to its initial, non-deflected position. In one embodiment, the fastening projection 21 and the receptacle 11 have corresponding asymmetric shapes that unambiguously define an orientation of the mounted stud 20. This helps to ensure a correct arrangement of the stud 20, even if the attachment is performed in a great hurry, for example during a game.

Depending on the materials used for the receptacle 11, it can be advantageous to provide the first locking member 12 or the upper end 27 of the fastening projection 21 with laterally inclined edges or chamfers 41 to facilitate insertion. The first locking member(s) 12 is typically disposed on a portion of the flexible wall(s) 16 closest the top surface 4 of the receptacle 11, so that the majority of the lower part of the receptacle 11 is capable of providing a reliable seat for the fastening projection 21.

When the fastening projection 21 of the stud 20 has been inserted into the receptacle 11 until it stops, the first locking member(s) 12 engages the second locking member(s) 23 via the elastic spring-back of the flexible wall(s) 16 of the receptacle 11. This action fastens the stud 20 to the sole 1. In contrast to the prior art, no additional metal and/or small components are necessary for locking. The receptacle 11 itself includes the cavity(ies) 15 and the flexible wall(s) 16, which reliably anchor the fastening projection 21.

As a result, an advantage of the present invention is realized, because only two injection molding processes are necessary for manufacturing a detachable cleat system in accordance with the invention. The first injection molding process is required to manufacture the receptacle 11, and the second is required to manufacture the sole 1 around the pre-manufactured receptacle 11. In a particular embodiment, materials are used which create a strong bond between the receptacle 11 and the surrounding sole 1 in which the receptacle 11 is mounted. For example, the receptacle 11 and the sole 1 may include materials that melt, or that may polymerize in a chemical reaction. In a preferred embodiment, the receptacle 11 is made from a material which has a greater rigidity and stiffness than the material used in the sole so that the receptacle can better resist the mechanical loads applied by the stud. For example, the receptacle 11 is manufactured from a fiber reinforced polyamide or a metal, and the sole 1 is manufactured from a common polyamide. This construction allows for a sufficiently elastic sole 1 that enables an easy rolling-off, depending on the respective field of use. Also, a torsional movement of the forefoot part with respect to the rearfoot part is possible with this construction.

As shown in FIGS. 1 and 3, the base member 10 itself projects like a stud downwardly from the sole 1. As such, the base member 10 can have a grip-improving function and provide the necessary space in the sole 1 for the arrangement of the receptacle 11. Further, the enlarged base member 10 prevents excessive strain where the base member 10 projects from the sole 1, thereby reducing the possibility of breaking-off single studs under peak loads. Alternatively, the receptacle 11 can be integrated into the sole 1 without an enlarged base member 10, such that the lower opening of the receptacle 11 is flush with the bottom surface 3 of the sole 1.

FIGS. 4–7 depict an alternative embodiment of a detachable cleat system in accordance with the invention. The sole 100 and stud 120 are similar in nature to the sole 1 and stud 20 described hereinabove. The sole 100 includes a base member 110 and a receptacle 111 disposed therein. The receptacle 111 includes two flexible walls 116, two cavities 115 and two first locking members 112 in the form of protrusions disposed on the flexible walls 116. Also included in this embodiment is an optional insert 130 that can stabilize and strengthen the lower part of the receptacle 111. The stud 120 includes a ground-engaging portion 125 and a fastening portion 121 extending therefrom. The fastening portion 121 includes two second locking members 123 in the form of recesses disposed on an external surface of the fastening portion 121.

As shown in FIGS. 4–7, the additional insert 130 is collar-like and is arranged around the fastening projection 121 of the stud 120 and stabilizes the fastening projection's seat at the receptacle 111. The insert 130 has a generally oblong shape and is disposed in a recess 141 located at a distal end 142 of the base member 110. Typically, the size and shape of the insert 130 will correspond to the size and shape of the base member 110. The insert 130 also includes contact areas 133 at its front and rear ends that improve the strength of the bond between the insert 130 and the receptacle 111. The insert 130 in another embodiment may be attached to the bottom surface 103 of the sole 100. Included on the longitudinal sides of the insert 130 are cutouts 135 that allow for an unhindered interaction of the locking means 112, 123 of the fastening projection of the stud 120, and the elastic wall 116 of the receptacle 111. Therefore, the insert 130 does not directly participate in the locking of the stud 120; however, the insert 130 reinforces the lowermost part of the receptacle 111. A circumferential projection 132 of the insert 130 fitting into a corresponding recess 128 of the stud 120 further increases the stability of the seat at the receptacle 111.

In conditions where the stud 120 is subjected to particularly high mechanical loads, such as a stud at the heel of a soccer shoe, the insert 130 can be further reinforced by an optional ring 140 (FIGS. 4–6) to increase stability and structural integrity of the cleat system. The ring 140 can be made of any material, but is preferably made from a metal, such as steel or aluminum. In a particular embodiment, the ring 140 is at least partially surrounded by the insert 130, which helps prevent the ring 140 from rusting. In the illustrated embodiment, the ring 140 has a generally circular structure and includes an opening 148; however, the ring 140 can be any suitable shape that helps to reduce the deformation of the insert 130 and the receptacle 111. Further, although the illustrated ring 140 is planar, a three dimensional shape is also conceivable.

Figure 6A:
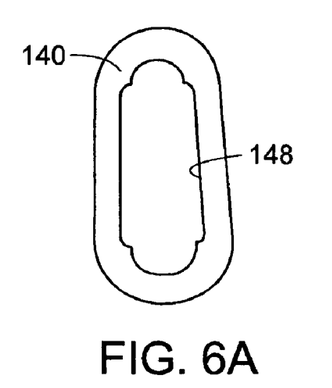
FIGS. 6A–6B are schematic top and side views of a ring for use in the insert of FIG. 4.
Figure 6B:
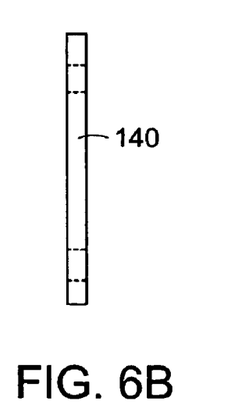
Figure 7:
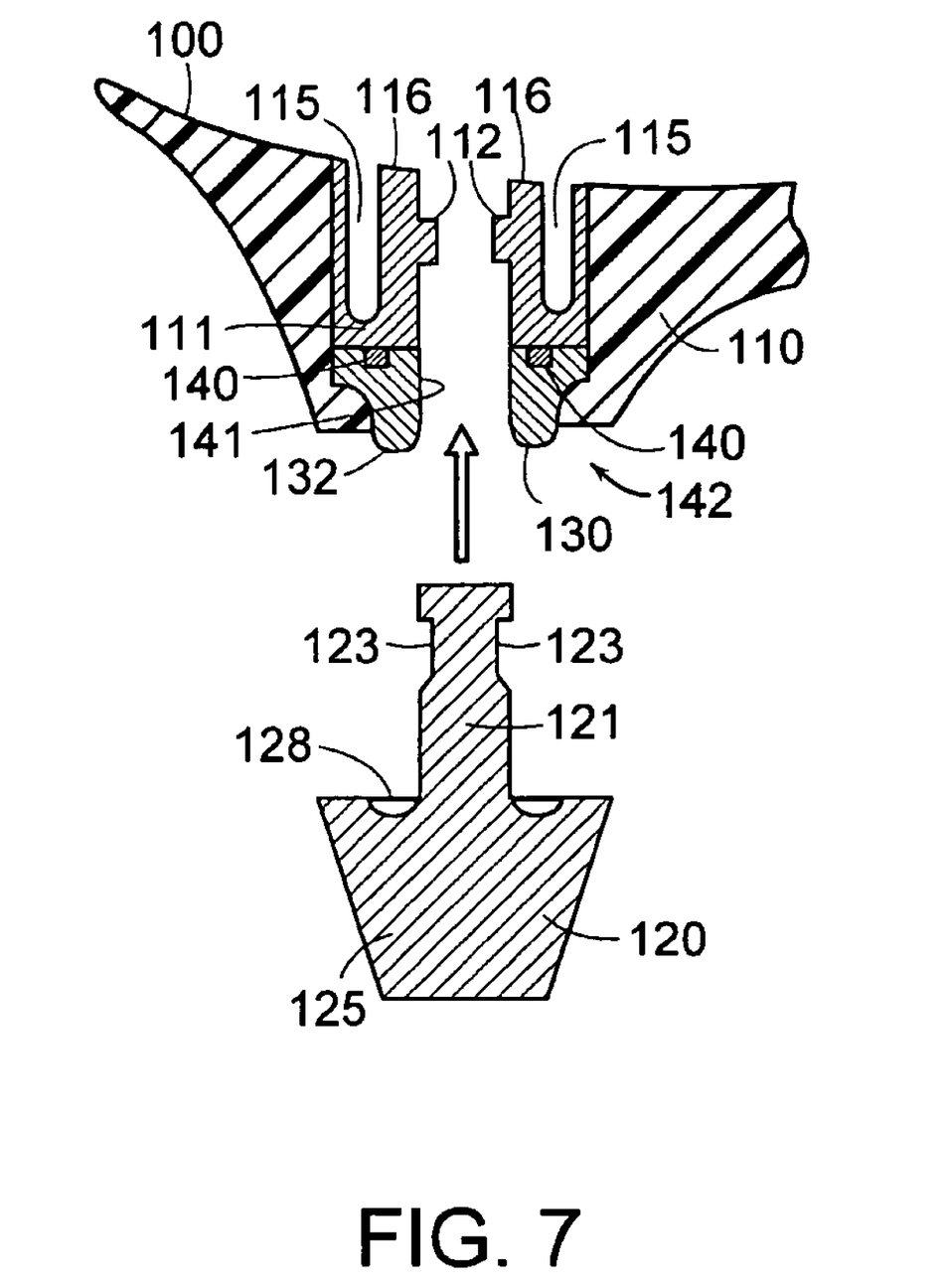
FIG. 7 is a schematic cross-sectional view of another embodiment of a detachable cleat system in accordance with the invention.

As discussed above with respect to the insert 130, the size and shape of the ring 140 generally corresponds to the size and shape of the insert 130 and, by extension, the size and shape of the base member 110. The opening 148 also corresponds to the size and shape of the receptacle 111 to allow for the passage of the fastening portion 121 therethrough. The ring 140 is shown as a relatively thin piece; however, the thickness of the ring 140 can vary to suit a particular application.

Figure 4:
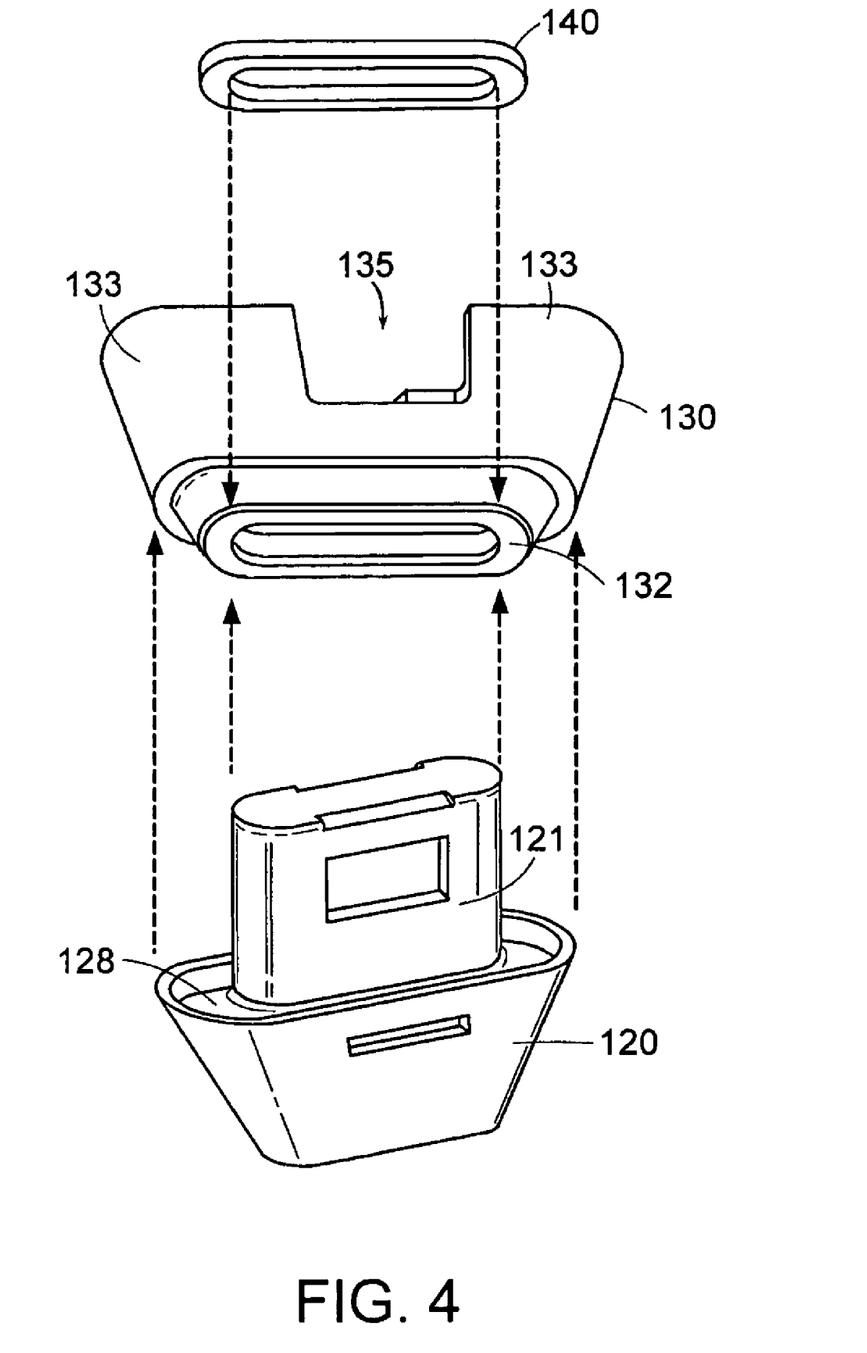
FIG. 4 is a schematic exploded view of one embodiment of a detachable cleat system in accordance with the invention.
Figure 5A:
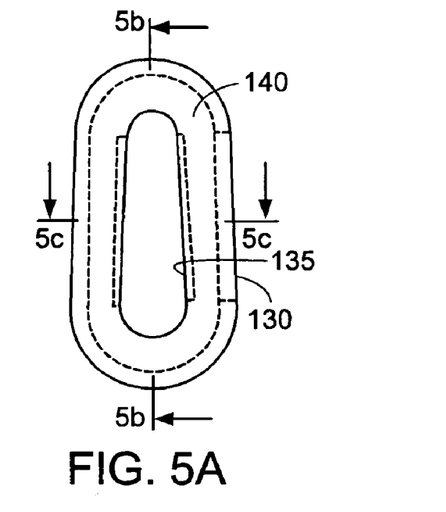
FIG. 5A is a schematic top view of the insert of FIG. 4
Figure 5B:
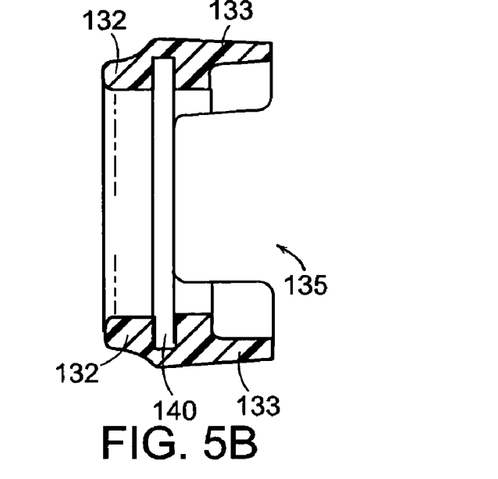
FIG. 5B is a schematic cross-sectional view of the insert of FIG. 4 taken about line 5B—5B of FIG. 5A.
Figure 5C:
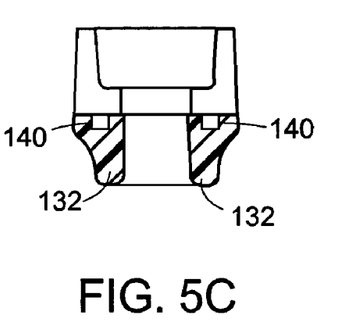
FIG. 5C is a schematic cross-sectional view of the insert of FIG. 4 taken about line 5C—5C of FIG. 5A.

The insert 130 can be molded from polyamide mixed with glass fibers; however, the insert 130 could be manufactured from any of the materials and by any process described herein or known to those skilled in the art. The insert 130 may be connected to the receptacle 111 by gluing, by co-injecting the receptacle 111 and the insert 130, or by any other known method. In a preferred embodiment, the insert 130 consists of a material that is reinforced to a greater extent than the stud 120. For example, the insert is made from a polyamide that has a greater fiber content than the stud 120. In one embodiment, the insert 130 is manufactured separately and then placed in the molds in which the sole 100 and receptacle 111 are produced. This method of manufacture achieves a good bond between the sole 100, the receptacle 111, and the insert 130, especially when the sole 100 and the receptacle 111 are also made from polyamide. The insert 130 can be injection molded around the ring 140 in the embodiment that includes the optional insert 130 and ring 140.

Figure 8:
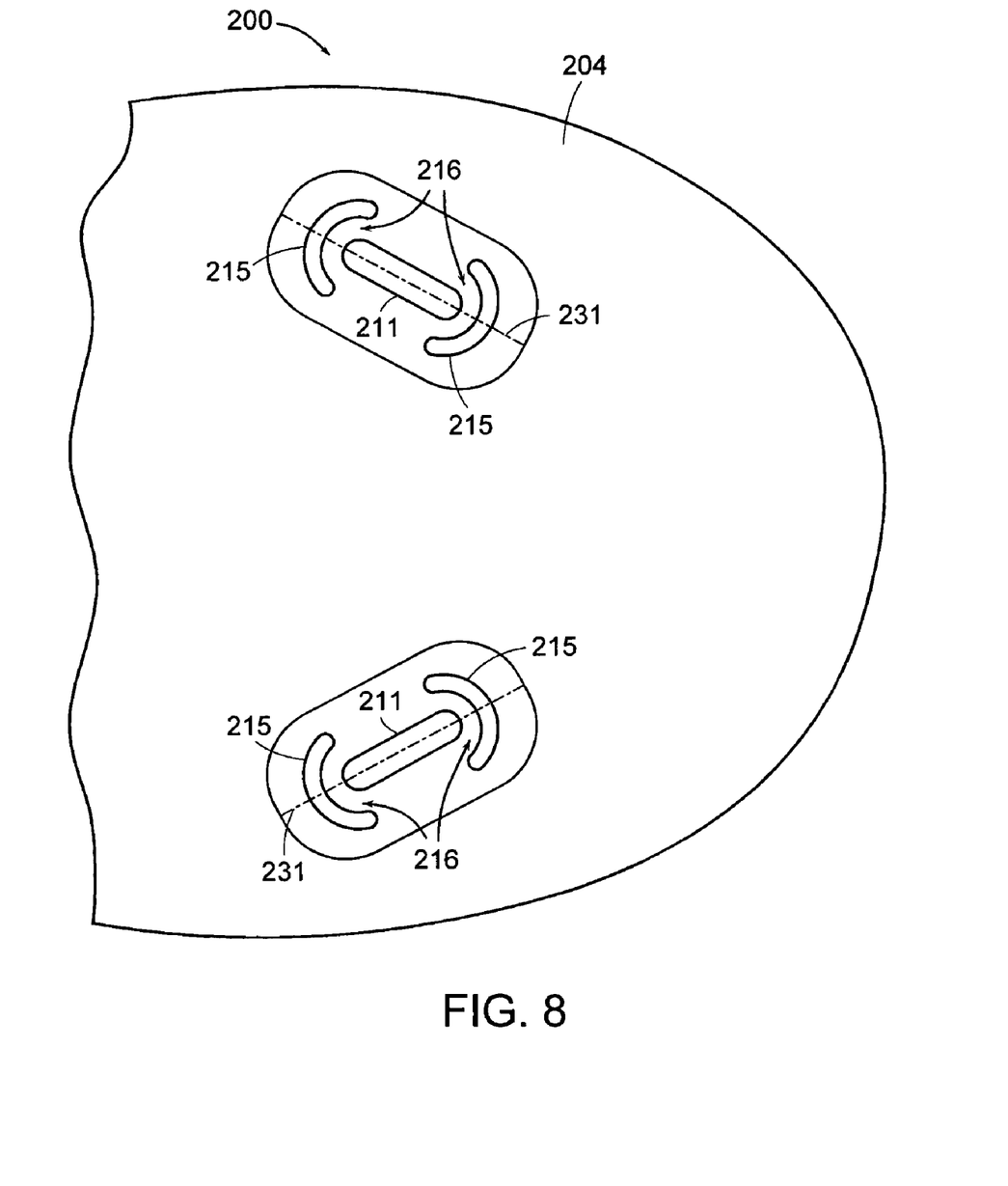
FIG. 8 is a schematic plan view of a portion of a sole having an alternative cavity shape and location in accordance with the invention.

FIG. 8 depicts a top surface 204 of a portion of a sole 200 having an alternative cavity 215 arrangement. In this arrangement, the flexible walls 216 and the cavities 215 are generally arcuate and surround semicircularly ends of each oblong receptacle 211. When a fastening projection of a stud is inserted into the receptacle 211, the flexible walls of the receptacle 211 are deflected longitudinally, i.e., parallel with a longitudinal axis 231 of the receptacle 211.

Figure 9:
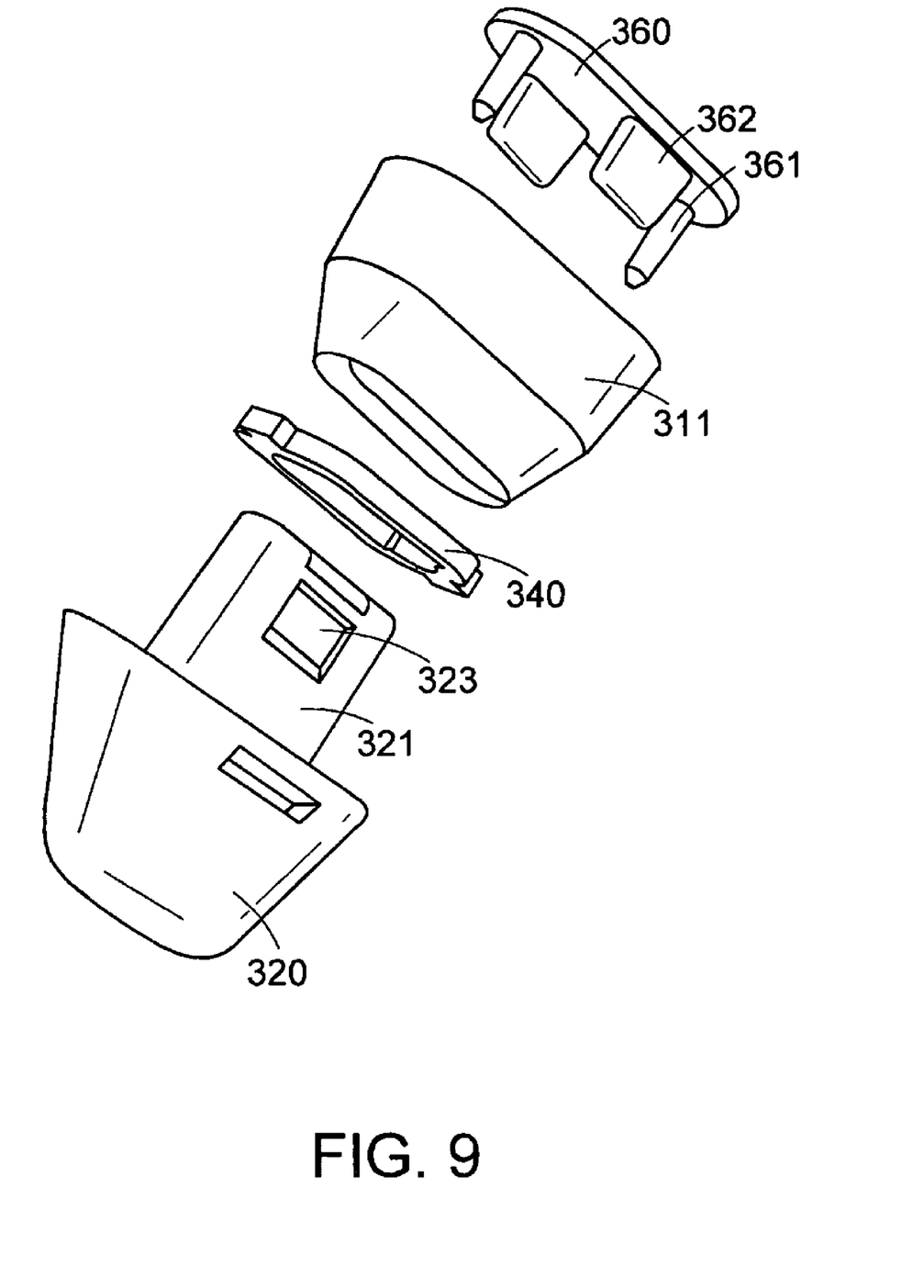
FIG. 9 is a schematic exploded view of another embodiment of a detachable cleat system in accordance with the invention.
Figure 10:
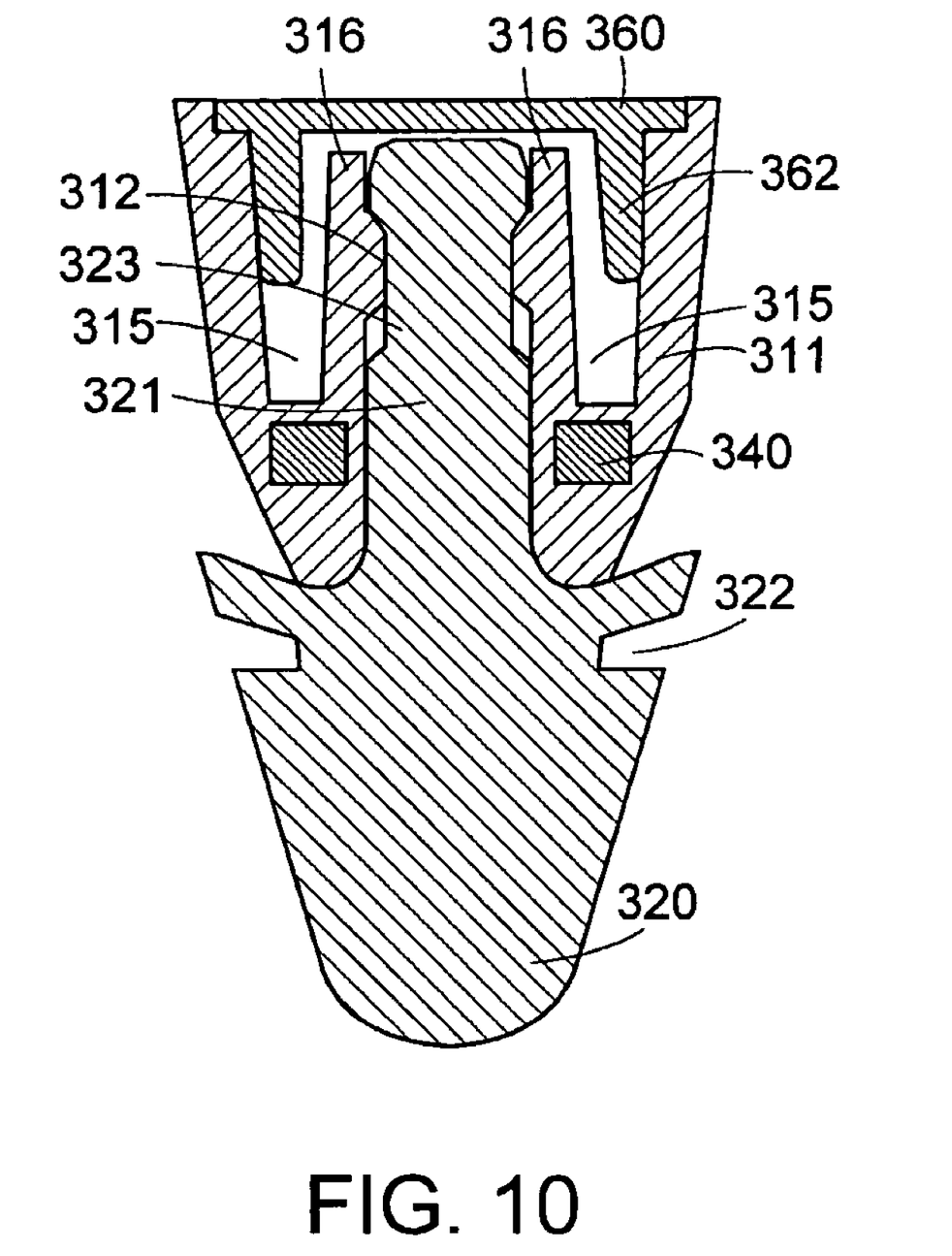
FIG. 10 is a schematic cross-sectional view of the detachable cleat system of FIG. 9.

FIGS. 9–10 show another embodiment of a detachable cleat system in accordance with the invention, wherein the cavities 315 of the receptacle 311 are closed from above by means of a separate seal 360. The seal 360 includes pins 361 that are used to fasten the seal to a correspondingly shaped recess of the receptacle 311. The seal 360 also includes side areas 362 that extend into the cavities 315 of the receptacle 311 without impairing the ability of walls 316 of the receptacle 311 to deflect (FIG. 10). In one embodiment, the pins 361 and/or the side areas 362 of the seal 360 may comprise locking elements that engage corresponding recesses in the receptacle 311 to avoid unintentional detachment of the seal 360.

The seal 360 helps prevent the penetration of material into the cavities 315, for example, the material used to manufacture the sole 300 around the pre-manufactured receptacle 311, or connecting glue. Preventing material from penetrating the cavities 315 avoids the possibility of the walls 316 of the receptacle 311 being hindered from deflecting into the cavities 315. Similarly, the seal 360 prevents penetration of material into the cavities 315 when an additional insole is glued to the finished sole 300. In an alternative embodiment, the cavities 315 may be sealed in a later step by the addition of a foil, which extends over a part or the complete area of the sole 300.

With continued reference to FIGS. 9 and 10, the ring 340 is mounted inside the receptacle 311 without using an insert 330. In this embodiment, the receptacle 311 is injection molded around the ring 340. Compared to a separate insert 330, the manufacture of the sole 300 is further simplified without reducing the stability of the anchoring stud 320.

The various components of the detachable cleat system can be manufactured by, for example, injection molding or extrusion. Extrusion processes may be used to provide a uniform shape, such as a single monolithic frame for the sole 1. Insert molding can then be used to provide the desired geometry of, for example, the receptacles 11, or the receptacles 11 could be created in the desired locations by a subsequent machining operation. Other manufacturing techniques include melting or bonding additional portions. For example, the base members 10 may be adhered to the sole 1 with a liquid epoxy or a hot melt adhesive, such as ethylene vinyl acetate (EVA). In addition to adhesive bonding, portions can be solvent bonded, which entails using a solvent to facilitate fusing of the portions to be added to the sole.

The various components of the detachable cleat system can be manufactured from any suitable polymeric material or combination of polymeric materials, either with or without reinforcement. Suitable materials include: polyurethanes, such as a thermoplastic polyurethane (TPU); ethylene vinyl acetate (EVA); thermoplastic polyether block amides, such as the Pebax® brand sold by Elf Atochem; thermoplastic polyester elastomers, such as the Hytrel® brand sold by DuPont; nylons, such as nylon 12, which may include 10 to 30 percent or more glass fiber reinforcement; silicones; polyethylenes; polyamides; and equivalent materials. Reinforcement, if used, may be by inclusion of glass or carbon graphite fibers or para-aramid fibers, such as the Kevlar® brand sold by DuPont, or other similar method. Also, the polymeric materials may be used in combination with other materials, for example rubber. Additionally, ceramic, aluminum, or other metals, which combine a low weight with high wear resistance, can be used for the studs 20. In the case of metal studs, the fastening projection 21 may be coated with a plastic layer that can slightly deform during insertion into the receptacle 21. Other suitable materials will be apparent to those skilled in the art.

Having described certain embodiments of the invention, it will be apparent to those of ordinary skill in the art that other embodiments incorporating the concepts disclosed herein may be used without departing from the spirit and scope of the invention. For example, the wall(s) and cavity(ies) can be provided in the studs, with the mating structure provided in the sole. Alternatively or additionally, locking members may be selectively provided on fewer than all walls in all receptacles, or along solely one side of the stud fastening projection. Each locking member may include multiple protuberances or recesses, as well as combinations thereof. Additionally, the locking member protuberances and recesses need not be of square or rectangular cross-section, as depicted. They could be provided with sawtooth or angled walls to facilitate insertion and provide enhanced retention against inadvertent release. Accordingly, the described embodiments are to be considered in all respects as only illustrative and not restrictive.

What is claimed is:

1. A sole comprising:
   a bottom surface defining a stud base having a sidewall;
   a receptacle disposed at least partially within the stud base, the receptacle including a flexible wall and a first locking member disposed on an internal surface of the flexible wall, a configuration of at least a portion of the stud base sidewall being directly defined by an outer surface of the receptacle during molding of the sole body; and
   a stud including a ground-engaging portion and a fastening projection extending therefrom for insertion into the receptacle, the fastening projection having a generally oblong shape, the receptacle defining a first cavity for receiving the flexible wall when deflected by the fastening projection.

2. The sole of claim 1, wherein the fastening projection of the stud further comprises a second locking member disposed on an external surface thereof, wherein the fastening projection deflects the flexible wall when inserted into the receptacle such that the first locking member and the second locking member engage.

3. The sole of claim 2, wherein the first locking member comprises a protuberance and the second locking member comprises a mating recess for engaging the protuberance when the fastening projection is inserted into the receptacle.

4. The sole of claim 1, wherein the receptacle includes a second flexible wall and an additional first locking member disposed on an internal surface of the second flexible wall and the fastening projection includes a corresponding additional second locking member disposed on the external surface of the fastening projection.

5. The sole of claim 4, wherein the receptacle further defines a second cavity formed adjacent the second flexible wall of the receptacle for receiving the second flexible wall when deflected by the fastening projection.

6. The sole of claim 4, wherein the two second locking members are disposed on a first longitudinal side and a second longitudinal side of the fastening projection and the two first locking members are disposed on corresponding flexible walls.

7. The sole of claim 1, wherein the ground-engaging portion of the stud includes an engagement feature for facilitating removing the stud from the receptacle.

8. The sole of claim 1, wherein the sole is formed from a first material comprising a first stiffness and the receptacle is formed from a second material comprising a second stiffness.

9. The sole of claim 1, wherein the sole is injection molded around the receptacle.

10. The sole of claim 1 wherein the receptacle forms an inseparable direct bond at least with the sidewall of the stud base.

* * * * *